US012146944B2

(12) United States Patent
John Wilson et al.

(10) Patent No.: US 12,146,944 B2
(45) Date of Patent: Nov. 19, 2024

(54) SENSOR BASED OBJECT DETECTION

(71) Applicant: QUALCOMM Incorporated, San Diego, CA (US)

(72) Inventors: Makesh Pravin John Wilson, San Diego, CA (US); Ahmed Kamel Sadek, San Diego, CA (US); Radhika Dilip Gowaikar, San Diego, CA (US); Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/589,769

(22) Filed: Jan. 31, 2022

(65) Prior Publication Data
US 2023/0273308 A1    Aug. 31, 2023

(51) Int. Cl.
*G01S 13/58* (2006.01)
*G01S 7/41* (2006.01)
*G01S 13/89* (2006.01)
*G01S 13/931* (2020.01)

(52) U.S. Cl.
CPC .............. *G01S 13/58* (2013.01); *G01S 7/417* (2013.01); *G01S 13/89* (2013.01); *G01S 13/931* (2013.01)

(58) Field of Classification Search
CPC .................................................. G01S 13/931
See application file for complete search history.

(56) References Cited

U.S. PATENT DOCUMENTS 7,496,449 B2 *  2/2009  Samukawa ........... G01S 7/4802
                                                  342/107
11,614,742 B2 *  3/2023  Wang ..................... G06T 7/521
                                                  701/23

FOREIGN PATENT DOCUMENTS

WO    2019201565 A1   10/2019
WO    2021108215 A1    6/2021

OTHER PUBLICATIONS

International Search Report and Written Opinion—PCT/US2022/080513—ISA/EPO—Feb. 24, 2023.

* cited by examiner

*Primary Examiner* — Vladimir Magloire
*Assistant Examiner* — Eric K Hodac
(74) *Attorney, Agent, or Firm* — QUALCOMM Incorporated

(57) ABSTRACT

The present disclosure generally relates to an object detection system. For example, aspects of the present disclosure relate to systems and techniques for performing object detection using sensor information, such as elevation and/or velocity information from one or more light-based sensors. One example apparatus generally includes one or more processors operably configured to: obtain sensor information indicating at least two objects in an environment; determine at least one of a velocity or an elevation associated with each object of the at least two objects; consolidate the at least two objects into a common object based on the at least one of the velocity or the elevation; and output an indication of the common object.

28 Claims, 12 Drawing Sheets

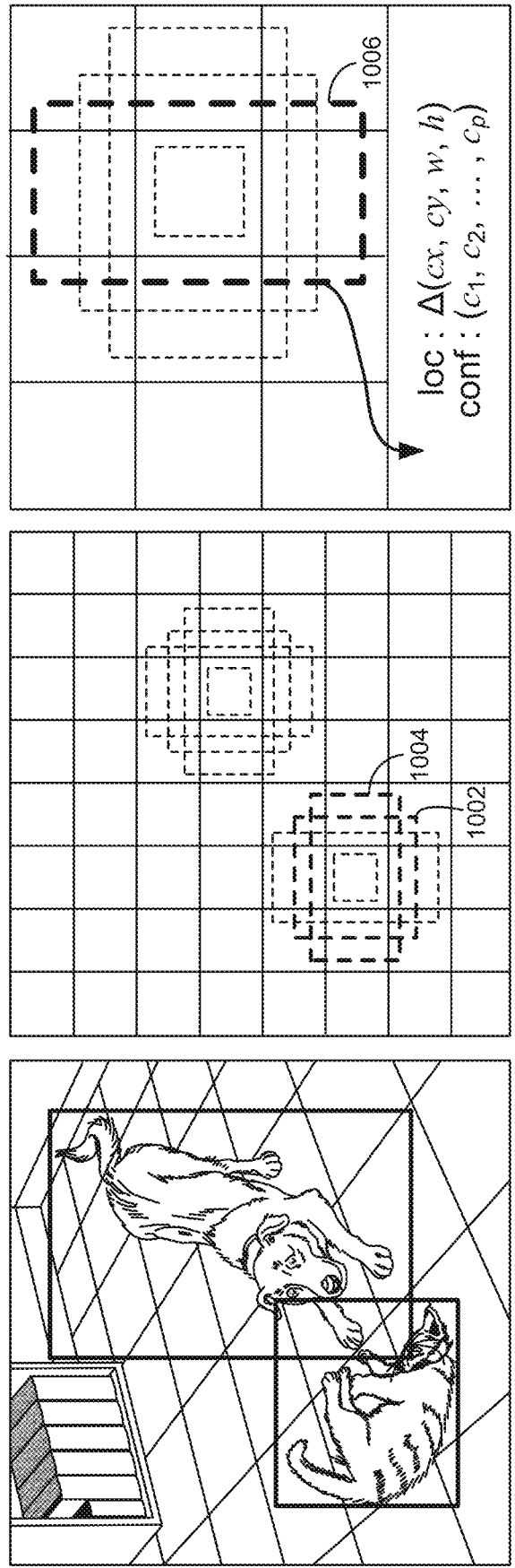

SENSOR BASED OBJECT DETECTION

FIELD

The present disclosure generally relates to an object detection system. For example, aspects of the present disclosure relate to systems and techniques for performing object detection using sensor information, such as elevation and/or velocity information from one or more light-based sensors.

BACKGROUND

Light-based sensors (e.g., light detection and ranging (LIDAR) sensors, radio detection and ranging (radar) sensors, etc.) are often employed on devices or systems, such as vehicles, mobile devices (e.g., a mobile telephone and/or mobile handset and/or so-called "smart phone" or other mobile device), among other devices and systems. Such light-based sensors can be used for many purposes. For example, radar and/or LIDAR sensors can be used for enhanced vehicle safety, such as adaptive cruise control (ACC), forward collision warning (FCW), collision mitigation or avoidance via autonomous braking, pre-crash functions such as airbag arming or pre-activation, and lane departure warning (LDW). Systems that employ light-based sensors with object detection can provide a high level of active safety capability and are increasingly available on production vehicles.

SUMMARY

Certain aspects of the present disclosure are directed towards an apparatus for object detection. The apparatus generally includes one or more processors operably configured to: obtain sensor information indicating at least two objects in an environment; determine at least one of a velocity or an elevation associated with each object of the at least two objects; consolidate the at least two objects into a common object based on the at least one of the velocity or the elevation; and output an indication of the common object.

Certain aspects of the present disclosure are directed towards an apparatus for object detection. The apparatus generally one or more processors operably configured to: obtain sensor information indicating at least two objects in an environment; detect, via a machine learning model, an object in the environment based on the sensor information and at least one of a velocity or an elevation associated with each of the at least two objects, wherein the detected object is associated with the at least two objects indicated by the sensor information; and output an indication of the object.

Some aspects are directed to a method for object detection. The method generally includes: obtaining sensor information indicating at least two objects in an environment; determining at least one of a velocity or an elevation associated with each object of the at least two objects; consolidating the at least two objects into a common object based on the at least one of the velocity or the elevation; and outputting an indication of the common object.

Some aspects are directed to a method for object detection. The method generally includes: obtaining sensor information indicating at least two objects in an environment; detecting, via a machine learning model, an object in the environment based on the sensor information and at least one of a velocity or an elevation associated with each of the at least two objects, wherein the detected object is associated with the at least two objects indicated by the sensor information; and outputting an indication of the object.

In some aspects, one or more of the apparatuses described above is, can be part of, or can include a vehicle or component or system of a vehicle, a mobile device (e.g., a mobile telephone or so-called "smart phone" or other mobile device), an Internet-of-Things (IoT) device, an extended reality (XR) device (e.g., a virtual reality (VR) device, an augmented reality (AR) device, or a mixed reality (MR) device), a wearable device, a personal computer, a laptop computer, a tablet computer, a server computer, a robotics device or system, an aviation system, or other device. In some aspects, one or more of the apparatuses includes an image sensor (e.g., a camera) or multiple image sensors (e.g., multiple cameras) for capturing one or more images. In some aspects, one or more of the apparatuses includes one or more displays for displaying one or more images, notifications, and/or other displayable data. In some aspects, one or more of the apparatuses includes one or more speakers, one or more light-emitting devices, and/or one or more microphones. In some aspects, one or more of the apparatuses described above can include one or more sensors. For instance, the one or more sensors can include at least one of a light-based sensor (e.g., a LIDAR sensor, a radar sensor, etc.), an audio sensor, a motion sensor, a temperature sensor, a humidity sensor, an image sensor, an accelerometer, a gyroscope, a pressure sensor, a touch sensor, and a magnetometer. In some cases, the one or more sensors can be used for determining a location of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIGS. 10A, 10B, and 10C are diagrams illustrating an example of a single-shot object detector.

DETAILED DESCRIPTION

Figure 1:
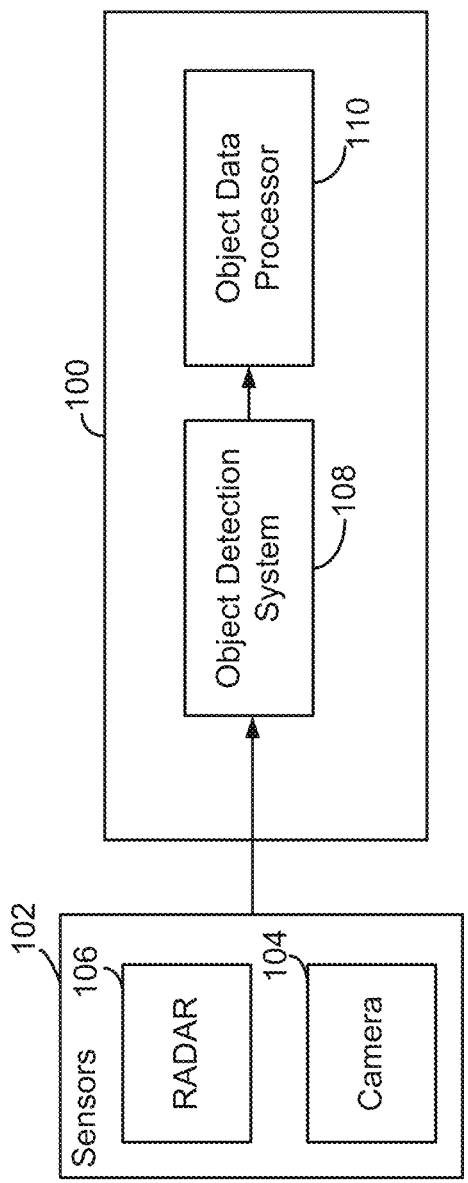
FIG. 1 is a block diagram illustrating an environmental analysis system for object detection and processing, in accordance with certain aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted above, light-based sensors, such as radar sensors and/or LIDAR sensors, can be employed by devices or systems (e.g., vehicles, mobile devices, extended realty systems, etc.) for various purposes. For example, one or more radar sensors mounted on a vehicle can be used to capture information of an environment surrounding the vehicle (e.g., in front of the vehicle, behind the vehicle, and/or to the sides of the vehicle). A processor within the vehicle (e.g., a digital signal processor (DSP) or other processor) can attempt to identify objects based on the information from the radar. Such objects may be other vehicles, pedestrians, road signs, objects within the road of travel, etc. For example, a radar system can include one or more sensors that utilize electromagnetic waves to determine information related to the objects, such as the location or range, altitude, direction, and/or speed of the objects along the road. In some examples, vehicles may make use of the one or more radar sensors for enhanced vehicle safety, such as adaptive cruise control (ACC), forward collision warning (FCW), collision mitigation or avoidance (e.g., via autonomous braking), pre-crash functions (e.g., airbag arming or pre-activation), lane departure warning (LDW), among others.

A radar system includes one or more transmitters that transmit electromagnetic waves in the radio or microwaves domain toward objects in the environment surrounding the vehicle. The electromagnetic waves reflect off surfaces in the environment and one or more receivers of the radar system is configured to receive the reflections of the electromagnetic waves. The reflected signals are processed to provide the information related to the objects within the environment such as a location of the object and velocity (e.g., speed) of the object. LIDAR systems operate similarly as radar systems, but use laser or light-emitting diode (LED) light instead of radio waves.

Light-based systems (e.g., radar systems, LIDAR systems, etc.) can output 0instantaneous data, tracked data, or a combination of instantaneous data and tracked data. Instantaneous data includes data that is identified by a reflected signal at one point in time and can include, for example, a location of the object, a signal to noise ration (SNR) of the signal, a radar cross section (RCS), a velocity of the object, an elevation of the object, etc. Light-based systems can also track data (referred to as tracked objects data) by measuring the object at different times. For example, a radar system may send electromagnetic signals at two different times and identify differences in the reflected signals. In some aspects, tracked data from a light-based system (e.g., a radar system) can provide length, width, yaw, an indication of whether the object is dynamic or static, and/or other information.

Systems, apparatuses, processes (also referred to as methods), and computer-readable media (collectively referred to herein as "systems and techniques") are described herein for detecting one or more objects using light-based systems, such as a radar or LIDAR system. While examples are described herein using radar systems for illustrative purposes, the systems and techniques may be performed using other light-based systems, such as LIDAR systems, time-of-flight (ToF) systems, structured light systems, any combination thereof, or other light-based systems, In some aspects, the systems and techniques can be used to identify regions (e.g., in one or more images) that correspond to an object. Regions identified by an object detection system may be represented as a bounding region (e.g., a bounding box or another region) that fits around a perimeter of a detected object such as a vehicle. In some cases, a bounding region from the object detection system can be used by another component or system to perform a function based on a position of that bounding region. For example, a bounding region may be input into a vehicle blind spot detector to identify the presence of an object in a blind spot that the vehicle or vehicle operator is unable to safely perceive.

In some scenarios, object detection outputs may be erroneous. For example, trucks or other large objects may be shown as being multiple separate objects instead of one single object. This issue may be more prominent in stop-and-go or slow-moving traffic. The systems and techniques described herein provide enhancements to improve large object detection (e.g., detection of trucks).

In some aspects, the systems and techniques described here may use various radar features (e.g., velocity, elevation, etc.) to improve object detection. In fast-moving traffic, multiple radar detections of the same large object may be associated with the same velocity (e.g., or about the same velocity). Based on the velocity information, multiple separate detected objects via radar may be combined into a single object when processed based on the objects having the same (or about the same) velocity.

In some aspects, the systems and techniques described here may use an algorithm to perform clustering of multiple objects into a single object based on elevation, velocity, or both. For example, some commercial radars also output elevation information. In general, larger objects such as trucks have higher elevations. The elevation information may be from a point cloud received from a radar sensor, whereas the object information may be from a tracked object output (e.g., tracked object data). The elevation information from the point cloud may be associated with (e.g., mapped to) the tracked object output before clustering, as described in more detail herein. In one illustrative example, in the event a system detects multiple smaller (e.g., smaller length and/or width) objects, the system may use the elevation information to determine whether to combine the multiple smaller objects to a single object (e.g., truck). For example, if the system determines that the elevation of the multiple objects are similar or approximately the same (e.g., within a threshold difference in height or elevation), then the system may consolidate or cluster the objects into a single object.

Further aspects and examples associated with the systems and techniques are described herein with respect to the figures.

FIG. 1 is a block diagram illustrating an environmental analysis system 100 for object detection and processing in accordance with certain aspects of the present disclosure. In some cases, the environmental analysis system 100 may be part of a vehicle and the sensors 102 may be part of the same vehicle. In other cases, environmental analysis system 100 may be part of a different entity than one or more of sensors 102. For example, the radar object detection system 100 may be part of one vehicle and may receive sensor information from another entity (e.g., another vehicle).

In some cases, environmental analysis system 100 may be part of a vehicle, and the sensors 102 may be taking measurement data associated with an environment surrounding the vehicle. In some aspects, the sensors 102 may include a radar 106 and a camera 104, although other types of systems or sensors may be included and used for object detection, such as one or more LIDAR systems, ToF systems, structured light systems, any combination thereof, or other light-based systems. The sensor information from the sensors 102 may be provided to an object detection system 108. The object detection system 108 may process the sensor information and provide an output indicating one or more objects that may be present in the environment. For example, the output may indicate the presence of a truck at a particular location relative to the vehicle. The object detection system 108 may detect various objects of different sizes. As described herein, some large objects may be detected as multiple objects, and the object detection system 108 may use velocity and/or elevation information to consolidate the multiple objects into a single object. The object information generated by the object detection system 108 may be provided to an object data processor 110. The object data processor 110 may manage one or more tasks such as autonomous driving based on the object information from the object detection system 108.

While the environmental analysis system 100 is shown to include certain components, one of ordinary skill in the art will appreciate that the environmental analysis system 100 can include more or fewer (and/or different) components than those shown in FIG. 1. For example, the radar object detection system 100 can include, in some instances, one or more memory devices (e.g., random access memory (RAM), read-only memory (ROM), cache, one or more buffers, and/or the like), one or more cameras, one or more sensors (e.g., radar sensors, inertial measurement units (IMUs), etc.), and/or any other hardware or processing devices (e.g., central processing units (CPUs), graphics processing units (GPUs), digital signal processors (DSPs), neural processing units (NPUs), etc.) that are not shown in FIG. 1.

Figure 2:
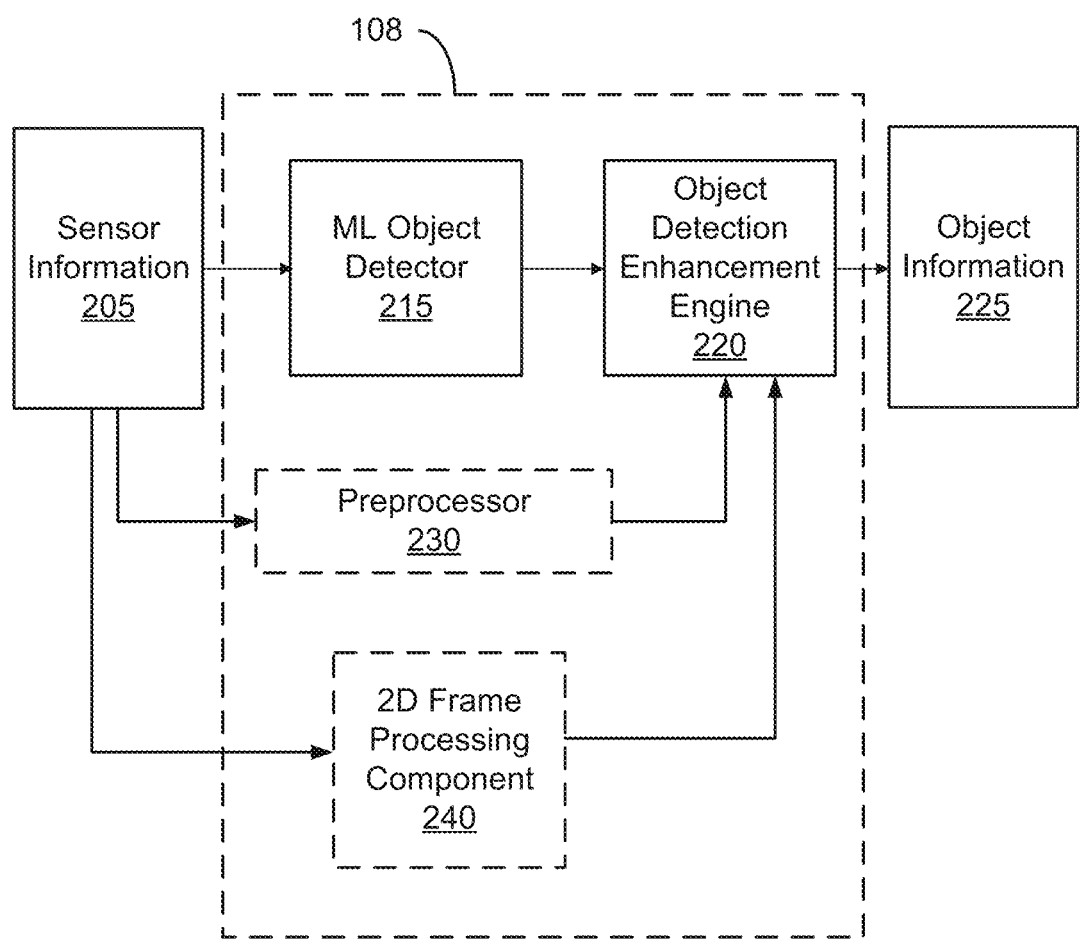
FIG. 2 is a block diagram illustrating an example of an object detection system, in accordance with certain aspects of the present disclosure.

FIG. 2 is a block diagram illustrating an example of object detection system 108, in accordance with certain aspects of the present disclosure. As shown, object detection system 108 may receive sensor information 205 (e.g., from one or more of sensors 102, such as radar 106). Object detection system 108 may include a machine-learning (ML) object detector 215. The ML object detector 215 may receive the sensor information 205 (e.g., radar information). In some aspects, the sensor information 205 may be a radar image (or frame) that includes a plurality of points (e.g., a point cloud), with each point indicating a signal reflected from that point and measurements of that point (e.g., location, velocity, elevation, SNR, RCS, etc.). In some cases, the radar image (or frame) may visually depict an intensity of electromagnetic reflections from objects in the environment. In some examples, the radar image (or frame) may include a list of objects (e.g., tracked object data) including attributes for each object, such as intensity, SNR, length, width, yaw, etc. In some aspects, the detected radar information may include multiple radar images (or frames).

The object detection system 108 may include an object detection enhancement engine 220, in accordance with certain aspects of the present disclosure. The ML object detector 215 may perform object detection using the sensor information. The output of the object detector 215 may be provided to the object detection enhancement engine 220. The object detection enhancement engine 220 may receive velocity and/or elevation information from the sensor information 205, as shown. Based on the velocity and/or elevation information, the object detection enhancement engine 220 may group similar detected objects that may belong to a common, single object. For example, the object detection enhancement engine 220 may detect that two objects are traveling at about the same velocity (or within a velocity threshold) or have about same elevation (or within an elevation threshold), and may group those objects accordingly into a single object to be provided as part of the object information 225.

In some aspects, the object detection enhancement engine 220 may consider objects that are within a certain distance for consolidation. For example, if two separate objects are within less that a meter from each other, the object detection enhancement engine 220 may consider grouping (e.g., consolidating) such objects based on velocity and/or elevation information, as described herein. The object detection enhancement engine 220 may output object information 225, which may be provided to the object data processor 110 of FIG. 1.

In some aspects, object detection system 108 may include a 2D frame processing component 240 which may receive a 2D frame (e.g., from camera 104). 2D frame processing component 240 may process the 2D frame for object detection or classification. For example, the 2D frame processing component 240 may be a machine learning model which may provide a classification (e.g., a truck) associated with an object. The output of the 2D frame processing component 240 may be provided to the object detection enhancement engine 220 to be used for object detection enhancement (e.g., for consolidation of objects). In some cases, an output of an intermediate layer of the processing component 240 (e.g., machine learning model) may be provided to object detection enhancement engine 220 as input to be used for the consolidation of objects.

Figure 3:
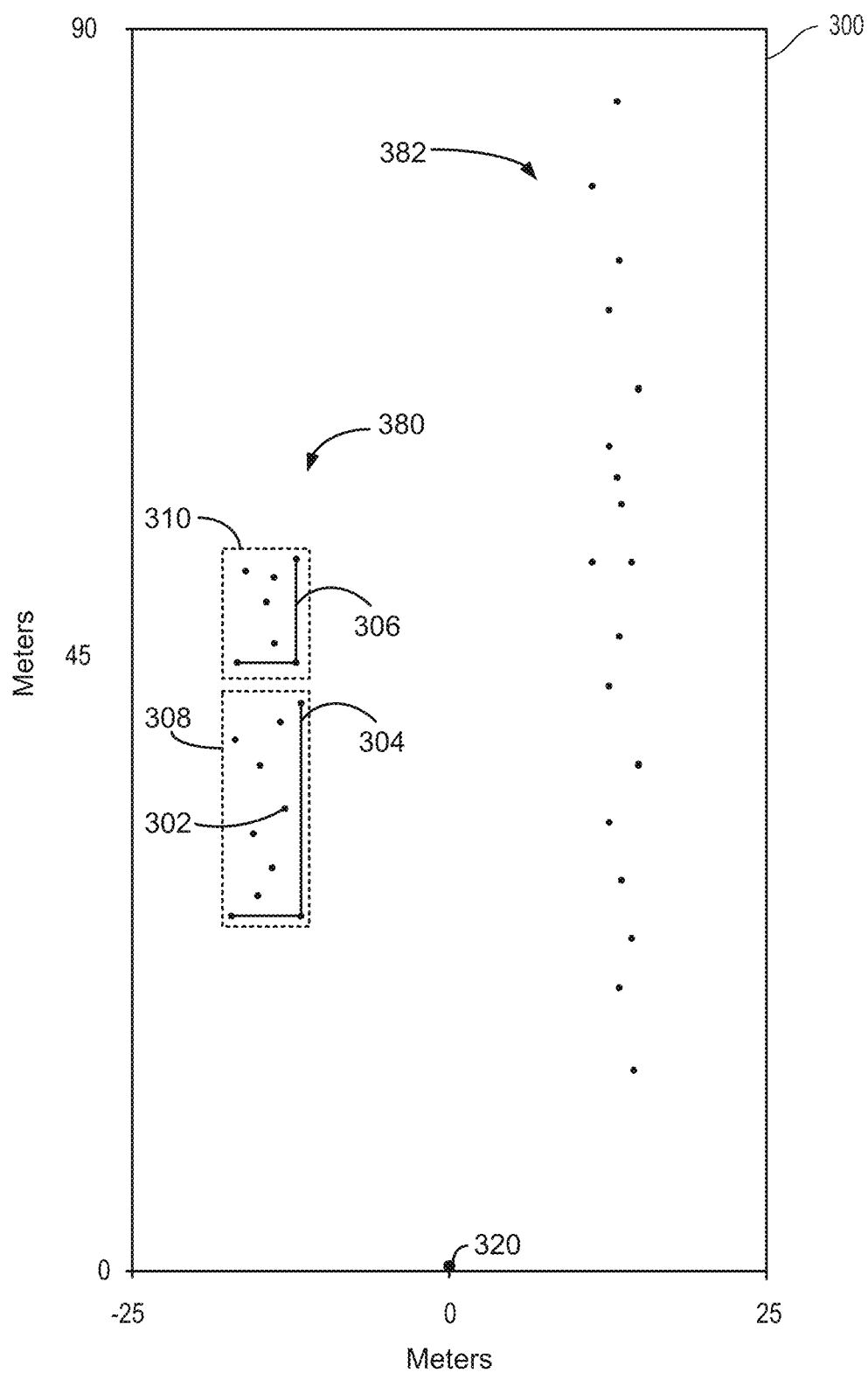
FIG. 3 is a diagram illustrating an example of a radar image, in accordance with certain aspects of the present disclosure.

FIG. 3 is a diagram illustrating an example of a radar image 300 representing output from a radar system (e.g., radar 106) for identifying objects in a surrounding environment of the radar system, in accordance with certain aspects of the present disclosure. The radar system may be located at point (0, 0) of the radar image 300 (e.g., at point 320).

The radar image 300 includes point cloud data that can be used to identify objects of interest in a physical environment surrounding the radar system. In some examples, the point cloud data is a collection of individual points within the environment that identify a measured parameter associated with objects within the environment. For example, the radar image 300 may be captured by a vehicle traveling down a highway. Radar data 380 may be associated with measurements of a truck on the highway and radar data 382 may be associated with measurements of objects on the side of the highway. Point 302 may be part of the point cloud and indicates a reflection at certain x and y dimensions. Moreover, the radar system may provide tracked object information. A tracked object may be represented by three connected dots indicating length and width associated with an object. For instance, the radar image 300 may include a tracked object 304 and a tracked object 306, each having a certain length in the x-direction and a width in the y-direction, as shown. The radar information may also indicate other information regarding each tracked object such as yaw or intensity.

As shown, based on the radar image 300, the ML object detector 215 may identify separate objects 308, 310. The object 308 may include the tracked object 304 as indicated by the radar information, and the object 310 may include the tracked object 306 as indicated by the radar information. As described, each point of the point cloud may indicate information such as velocity and elevation.

In some aspects, each point of the point cloud maybe associated with (e.g., mapped to) a tracked object in order to map the velocity and elevation information from the point cloud to the tracked objects. For example, referring back to FIG. 2, a preprocessor 230 may receive the sensor information 205 (e.g., radar information) and associate one or more points (e.g., point 302 of FIG. 3) of the point cloud with a tracked object (e.g., tracked object 304) in the radar image 300. In this manner, the velocity and elevation information provided by the point cloud may be linked to tracked objects such that each tracked object has corresponding velocity or elevation information. Thus, for instance, the tracked object 304 may be assumed to have the same velocity and elevation as indicated by point 302 due to an association between point 302 and tracked object 304. The association between points of the point cloud and tracked objects may be performed using any suitable technique. For example, the association may be performed using a distance-based approach. For example, a point of the point cloud may be associated with a tracked object if the point and the tracked object are within a threshold distance.

In some aspects, based on the velocity and/or elevation information, object detection enhancement engine 220 may determine that the objects 308, 310 should be grouped into a single object. For example, objects 308, 310 may both be associated with a truck traveling down a road. As a result, both objects 308, 310 may have the same velocity, and in some cases, about the same elevation. Therefore, based on the velocity and elevation information, objects 308, 310 may be combined into a single object. For instance, the object detection enhancement engine 220 may determine a difference between the velocity (and/or elevation) of object 308 and the velocity (and/or elevation) of object 310, and if the difference is less than a threshold, consolidate the objects 308, 310 into a single object, as described herein.

In some aspects, the object detection enhancement engine 220 may further consider information from sensors other than radar. For example, based on data from a camera, the 2D frame processing component 240 may determine a classification of objects. The 2D frame processing component 240 may determine that a particular object is a truck. This information may be provided to object detection enhancement engine 220 to determine whether to combine the objects into a single object, as described herein.

Figure 4:
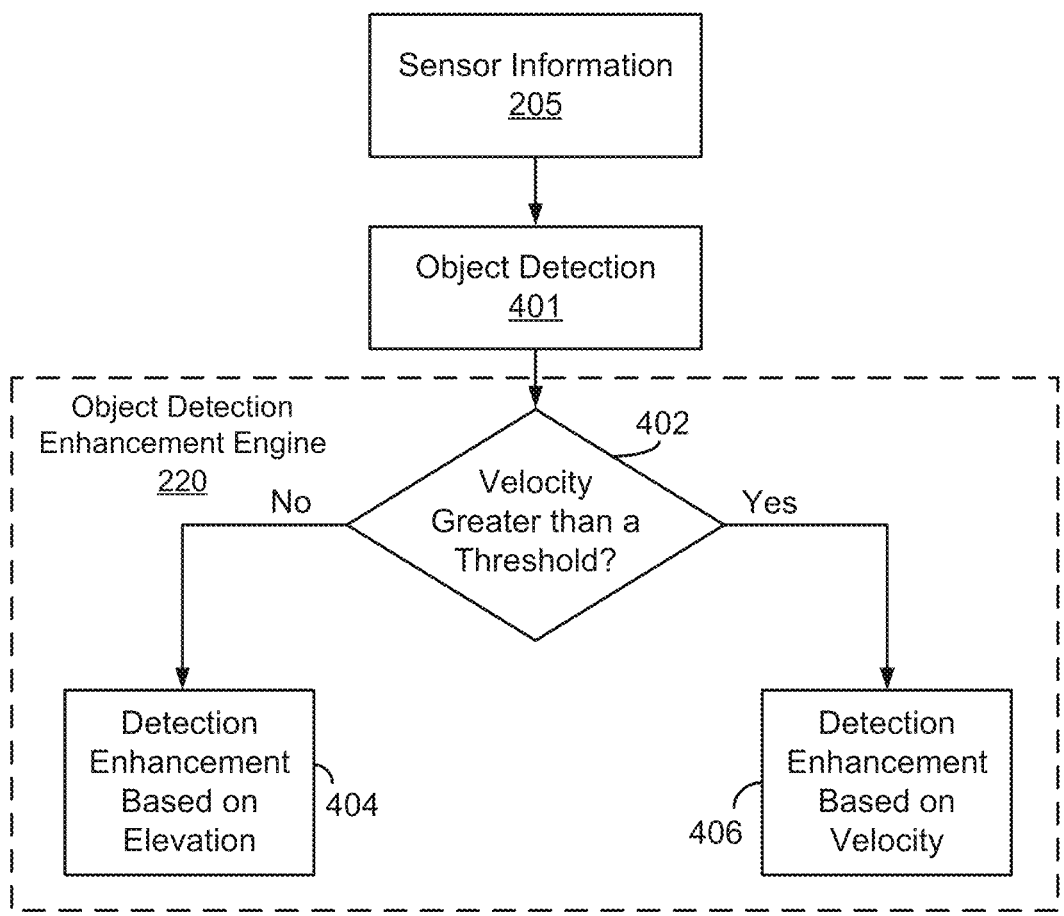
FIG. 4 is a block diagram illustrating objection enhancement techniques, in accordance with certain aspects of the present disclosure.

FIG. 4 is a block diagram illustrating objection enhancement techniques in accordance with certain aspects of the present disclosure. As shown, at block 401, the object detector 215 may process sensor information 205 to detect multiple objects, such as objects 308, 310 of FIG. 3. At block 402, the object detection enhancement engine 220 may compare the velocity of the detected objects to a velocity threshold. Suppose the velocity is greater than the velocity threshold. In that case, the object detection enhancement engine 220 may perform object detection enhancement based on velocity information at block 404. If the velocity is less than the velocity threshold, the object detection enhancement engine 220 may perform object detection enhancement based on the elevation information at block 406. For example, if the sensor information (e.g., radar information) indicates that object 308 and object 310 have a velocity greater than a velocity threshold (e.g., 10 mph), the object detection enhancement engine 220 may determine whether to consolidate the objects 308, 310 into a single object based on velocity. Otherwise, the object detection enhancement engine 220 may determine whether to consolidate the objects 308, 310 into a single object based on elevation.

In some aspects, the object detection enhancement engine 220 may perform the consolidation of objects based on both velocity and elevation. At lower velocities of objects, elevation information may be given greater weight when determining whether to consolidate the objects, and at higher velocities of objects, velocity information may be given greater weight when determining whether to consolidate the objects. For example, if the objects 308, 310 are traveling at high speeds (e.g., 60 mph), object detection enhancement engine 220 mostly takes into consideration the velocity of the objects 308, 310 when determining whether to consolidate the objects into a single object. As velocity decreases, the weight given to velocity as a parameter for determining whether to consolidate decreases and the weight given to elevation as a parameter for determining whether to consolidate increases.

Figure 5:
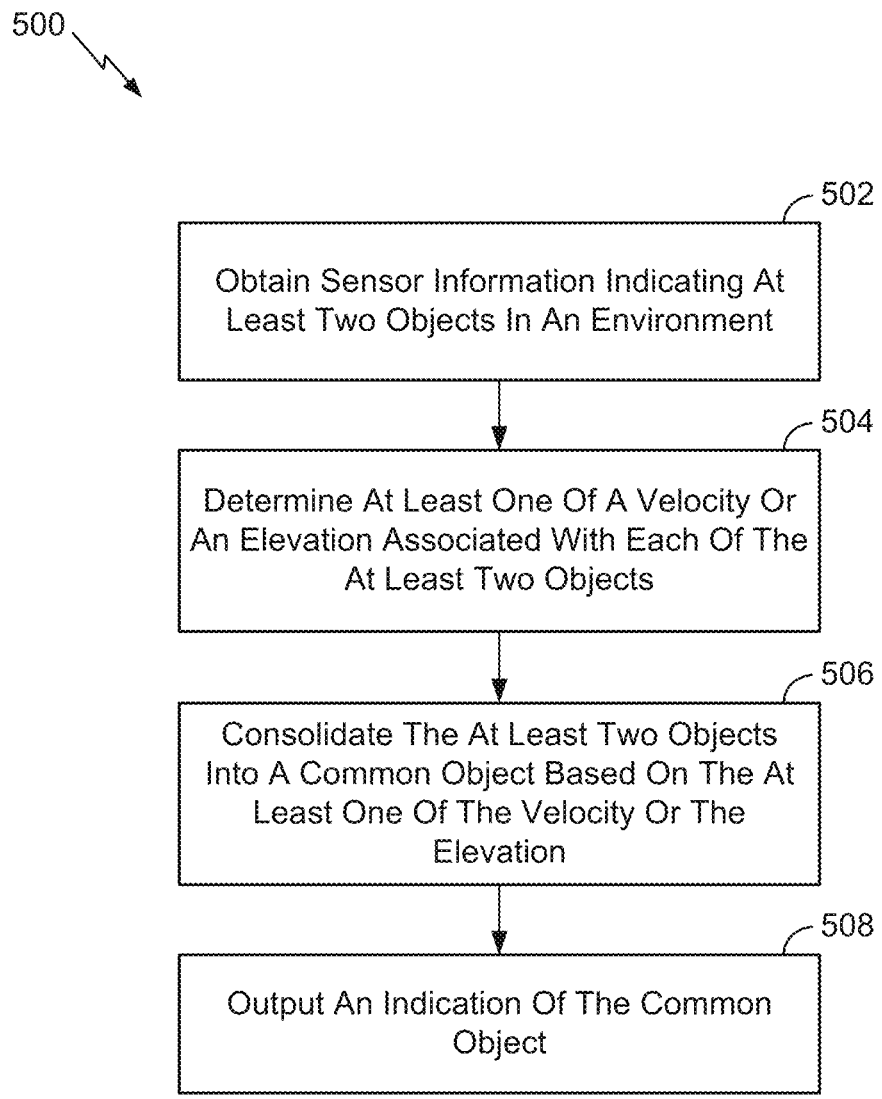
FIG. 5 is a flow diagram illustrating an example process for object detection using detection enhancement, in accordance with certain aspects of the present disclosure.

FIG. 5 is a flow diagram illustrating an example process 500 for object detection, in accordance with certain aspects of the present disclosure. The operations of the process 500 may be performed by an environmental analysis system, such as the environmental analysis system 100 including an object detection system 108.

At block 502, the object detection system obtains sensor information (e.g., sensor information 205) indicating at least two objects in an environment. For example, while the sensor information may indicate the presence of at least two objects, the at least two objects may in fact be a single object in the environment. At block 504, the object detection system determines at least one of a velocity or an elevation associated with each object of the at least two objects. For example, the object detection system may determine the at least one of the velocity or the elevation based on the sensor information indicating the at least one of the velocity or the elevation.

At block 506, the object detection system consolidates the at least two objects (e.g., objects 308, 310) into a common object based on the at least one of the velocity or the elevation, and at block 508, the object detection system outputs an indication of the common object. In some aspects, to consolidate the at least two objects, the object detection system determines whether to consolidate the at least two objects based on whether a difference between velocities of the at least two objects is less than a velocity threshold or whether a difference between elevations of the at least two objects is less than an elevation threshold.

In some aspects, the object detection system determines whether the velocity is less than a velocity threshold (e.g., at block 402 as described with respect to FIG. 4), and consolidates the at least two objects based on the elevation in response to the velocity being less than the velocity threshold. In some aspects, the object detection system consolidates the at least two objects based on the velocity and the elevation by assigning a higher weight to the elevation as compared to velocity at lower velocities and a lower weight to the elevation as compared to velocity at higher velocities.

In some aspects, the object detection system processes, via a machine learning model (e.g., ML object detector 215), the sensor information to generate a machine learning output indicating the at least two objects, and consolidates the at least two objects based on the machine learning output. In some aspects, the sensor information includes a point cloud indicating the at least one of velocity or the elevation and object detection information indicating objects in the environment. The object detection system maps (e.g., via preprocessor 230) the at least one of the velocity or the elevation indicated by points of the point cloud to the objects indicated by the object detection information. The object detection system may consolidate the at least two objects based on the mapping of the at least one of the velocity or the elevation to the objects.

In some aspects, the object detection system determines at least one classification associated with the at least two objects. For example, the object detection system may receive an indication (e.g., wirelessly) from another entity indicating the classification. The indicating of the classification may be from another vehicle and communicated using any suitable technique such as a car-to-everything (C2X) protocol or cellular vehicle-to-everything (CV2X) protocol. In some aspects, the classification may be determined (e.g., via 2D frame processing component 240) based on sensor information from one or more sensors (e.g., a camera). The object detection system may consolidate the at least two objects based on the at least one classification. In some aspects, the object detection system analyzes input data from a camera (e.g., camera 104) via a machine learning model, and consolidates the at least two objects based on an output of an intermediate layer of the machine learning model.

Figure 6:
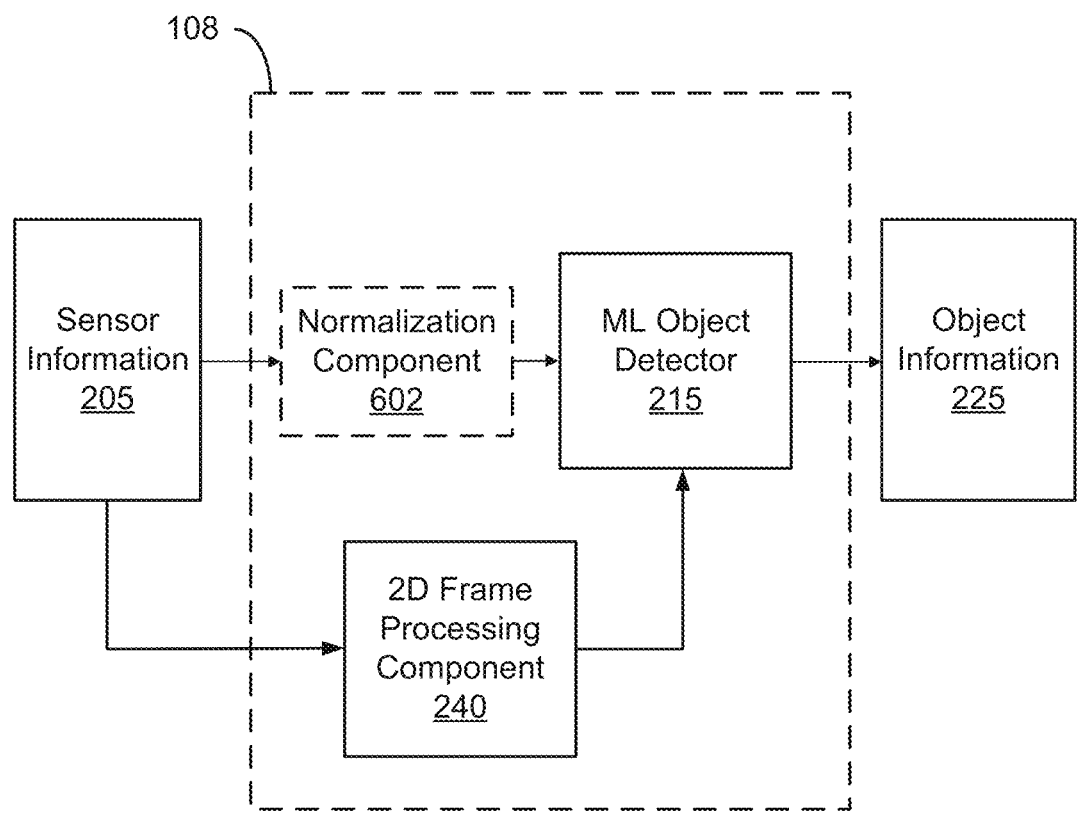
FIG. 6 is a block diagram illustrating object detection using a machine learning object detector, in accordance with certain aspects of the present disclosure.

FIG. 6 is a block diagram illustrating object detection using an ML object detector 215, in accordance with certain aspects of the present disclosure. In this case, the ML object detector 215 may receive the sensor information 205, including a point cloud having velocity and/or elevation information, as well as tracked object information, and process the sensor information 205 for object detection. For example, ML object detector 215 may be a deep learning network. The elevation and/or velocity information may be provided as a feature to the deep learning network along with the tracked object information.

In some cases, object detection system 108 may include a normalization component 602 which may normalize the features to be provided the ML object detector 215. For example, the velocity information may be normalized to be represented within a range of −1 to +1 and the elevation information may be normalized to be represented within a range of −1 to +1.

As described herein, object detection system 108 may include a 2D frame processing component 240 which may analyze a 2D frame (e.g., from camera 104) for object detection or classification. The output of the 2D frame processing component 240 may be provided as an input to the ML object detector 215 to be used for consolidating objects, as described herein. In some cases, the 2D frame processing component 240 may include a machine learning model. An output of an intermediate layer of the 2D frame processing component 240 may be provided as an input to ML object detector 215 to be used for consolidating objects.

In some aspects, the radar information may include velocity information, elevation information, or both. The ML object detector 215 may generate the object information 225 based on the radar information including the velocity and/or elevation information. For example, the ML object detector 215 may be trained to detect objects by taking into account velocity and/or elevation information, reducing the likelihood that a large object is detected as multiple smaller objects as described herein. In some aspects, a long short-term memory (LSTM) layer, recurrent neural network, or attention mechanism may be implemented as part of the ML object detector 215 to aggregate data across time. For example, there may be feedback in the network to take into account temporal information. The network may consider previous outputs of the network when performing object detection.

Figure 7:
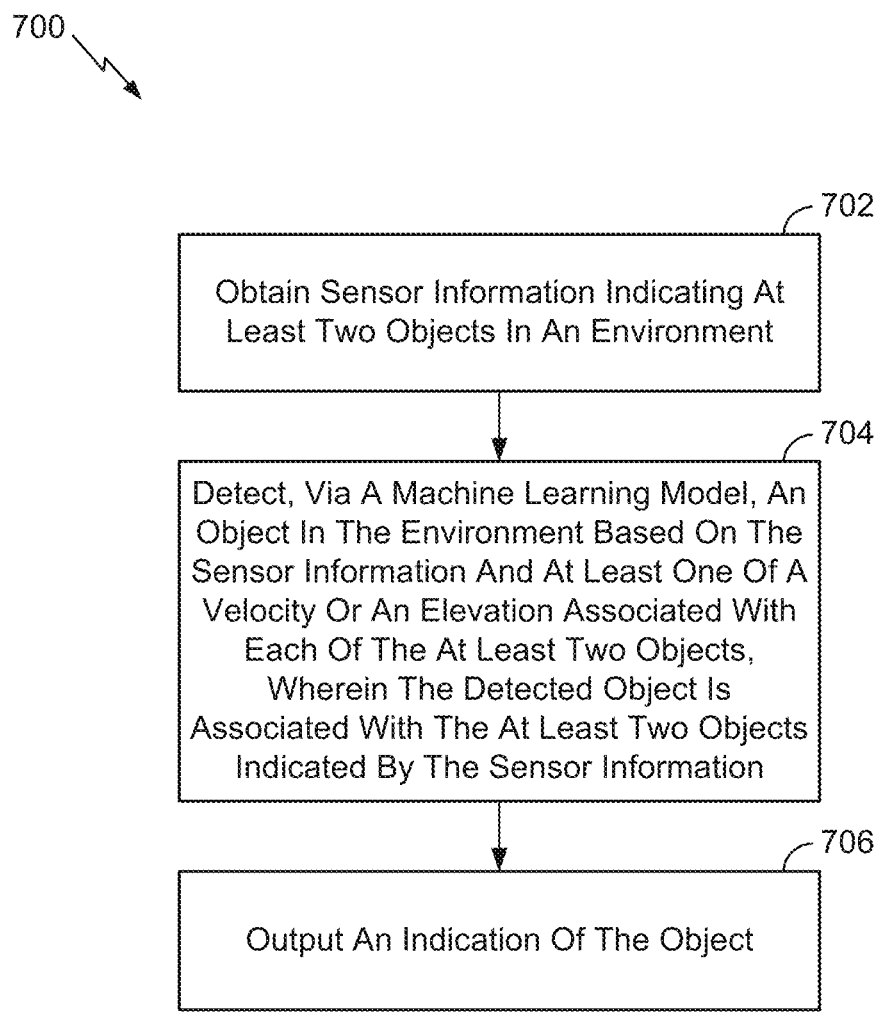
FIG. 7 is a flow diagram illustrating an example process for object detection using machine learning, in accordance with certain aspects of the present disclosure.

FIG. 7 is a flow diagram illustrating an example process 700 for object detection in accordance with certain aspects of the present disclosure. The operations of the process 700 may be performed by an object detection system, such as the object detection system 100 of FIG. 1.

At block 702, the object detection system obtains sensor information (e.g., sensor information 205) indicating at least two objects (e.g., associated with objects 308, 310) in an environment. For example, while the sensor information may indicate the presence of at least two objects, the at least two objects may in fact be a single object in the environment.

At block 704, the object detection system detects, via a machine learning model (e.g., ML object detector 215), an object in the environment based on the sensor information and at least one of a velocity and an elevation associated with each of the at least two objects. The detected object may be associated with the at least two objects indicated by the sensor information. In some aspects, the sensor information may indicate the at least one of the velocity or the elevation. At block 706, the object detection system outputs an indication of the object.

In some aspects, the sensor information includes a point cloud indicating the at least one of the velocity or the elevation and object detection information indicating the at least two objects in the environment. In some aspects, the object detection system analyzes input data from a camera via another machine learning model (e.g., 2D frame processing component 240) and detects the object based on an output of an intermediate layer of the other machine learning model.

Figure 8:
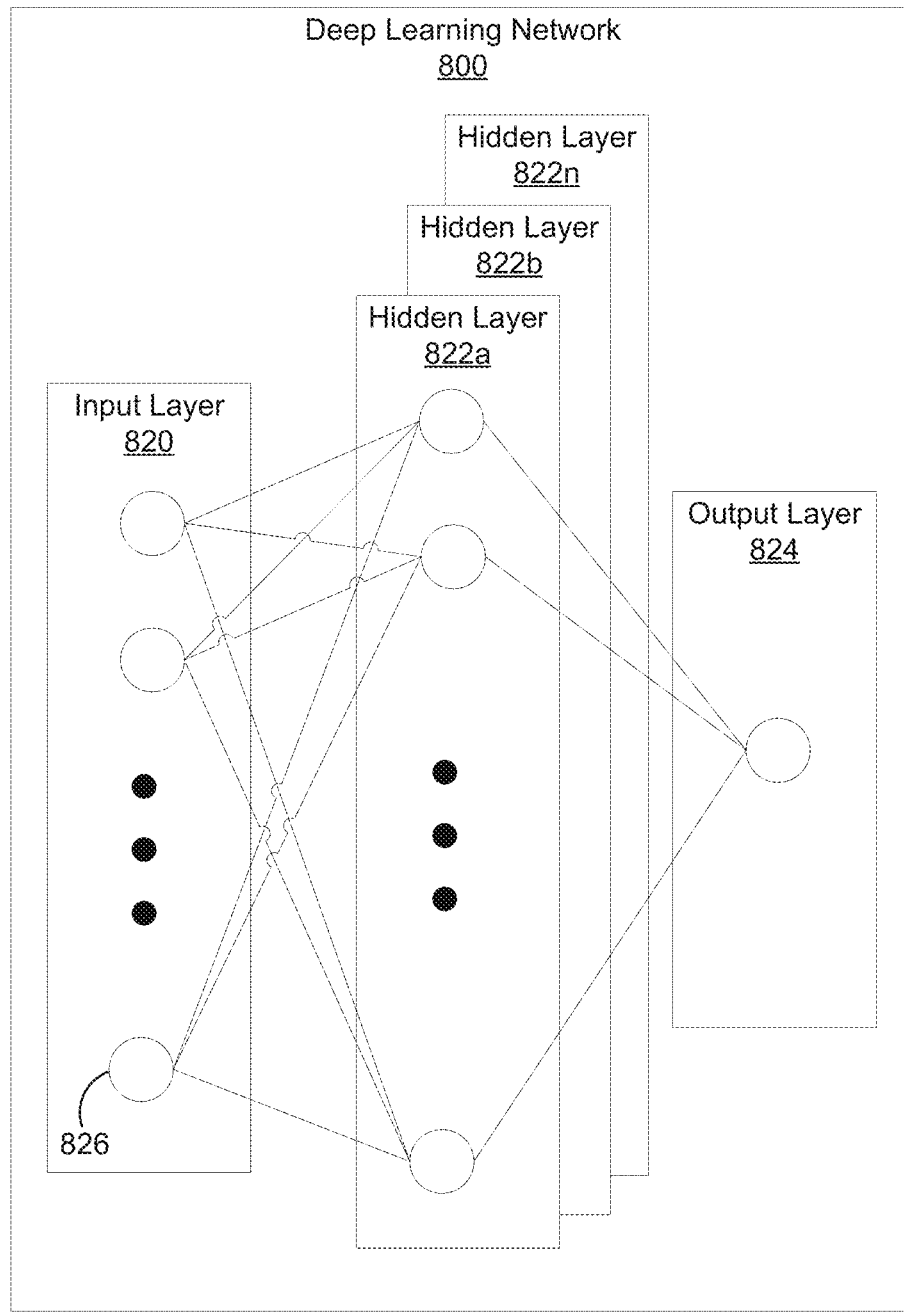
FIG. 8 is an illustrative example of a deep neural network that can be used to perform object detection.

As noted above, the object detection and tracking system can use an ML-based object detector (e.g., based on a deep neural network) to perform object detection. FIG. 8 is an illustrative example of a deep neural network 800 that can be used to perform object detection on an image containing a target object. Deep neural network 800 includes an input layer 820 that is configured to ingest input data, such as pre-processed (scaled) sub-images that contain a target object for which detection is to be performed. In one illustrative example, the input layer 820 can include data representing the pixels of an input image or video frame. The neural network 800 includes multiple hidden layers 822*a*, 822*b*, through 822*n*. The hidden layers 822*a*, 822*b*, through 822n include "n" number of hidden layers, where "n" is an integer greater than or equal to one. The number of hidden layers can be made to include as many layers as needed for the given application. The neural network 800 further includes an output layer 824 that provides an output resulting from the processing performed by the hidden layers 822a, 822b, through 822n. In one illustrative example, the output layer 824 can provide a classification for an object in an image or input video frame. The classification can include a class identifying the type of object (e.g., a person, a dog, a cat, or other object).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the hidden layers 822a, 822b, through 822n can transform the information of each input node by applying activation functions to this information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 824. In an example in which the neural network 800 is used to identify objects in images, the neural network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in images, the forward pass can include passing a training image through the neural network 800. The weights are initially randomized before the neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 800 can include any suitable deep network. One example includes a CNN, which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
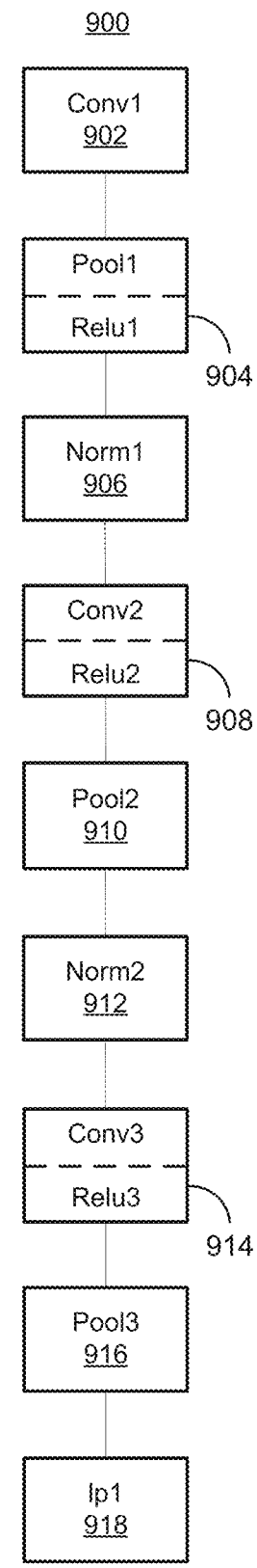
FIG. 9 is a diagram illustrating an example neural network.

FIG. 9 is a diagram illustrating an example of the Cifar-10 neural network 900. In some cases, the Cifar-10 neural network can be trained to classify specific objects, such as vehicles only. As shown, the Cifar-10 neural network 900 includes various convolutional layers (Conv1 layer 902, Conv2/Relu2 layer 908, and Conv3/Relu3 layer 914), numerous pooling layers (Pool1/Relu1 layer 904, Pool2 layer 910, and Pool3 layer 916), and rectified linear unit layers mixed therein. Normalization layers Norm1 906 and Norm2 912 are also provided. A final layer is the ip1 layer 918.

Another deep learning-based detector that can be used to detect or classify objects in images includes the SSD detector, which is a fast single-shot object detector that can be applied for multiple object categories or classes. Traditionally, the SSD model is designed to use multi-scale convolutional bounding box outputs attached to multiple feature maps at the top of the neural network. Such a representation allows the SSD to efficiently model diverse box shapes, such as when the size of an object is unknown in a given image. However, using the systems and techniques described herein, the sub-image extraction and the width and/or height scaling of the sub-image can allow an object detection and tracking system to avoid having to work with diverse box shapes. Rather, the object detection model of the detection and tracking system can perform object detection on the scaled image in order to detect the position and/or location of the object (e.g., a target vehicle) in the image.

FIG. 10A-FIG. 10C are diagrams illustrating an example of a single-shot object detector that models diverse box shapes. FIG. 10A includes an image and FIG. 10B and FIG. 10C include diagrams illustrating how an SSD detector (with the Visual Geometry Group (VGG) deep network base model) operates. For example, SSD matches objects with default boxes of different aspect ratios (shown as dashed rectangles in FIG. 10B and FIG. 10C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (box 1002 and box 1004 in FIG. 10B) are matched with the cat, and one of the 4×4 boxes (box 1006 in FIG. 10C) is matched with the dog. SSD has multiple features maps, with each feature map being responsible for a different scale of objects, allowing it to identify objects across a large range of scales. For example, the boxes in the 8×8 feature map of FIG. 10B are smaller than the boxes in the 4×4 feature map of FIG. 10C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 10A, all probability labels would indicate the background class with the exception of the three matched boxes (two for the cat, one for the dog).

As noted above, using the systems and techniques described herein, the number of scales is reduced to the scaled sub-image, upon which an object detection model can perform object detection to detect the position of an object (e.g., a target vehicle).

Figure 11C:
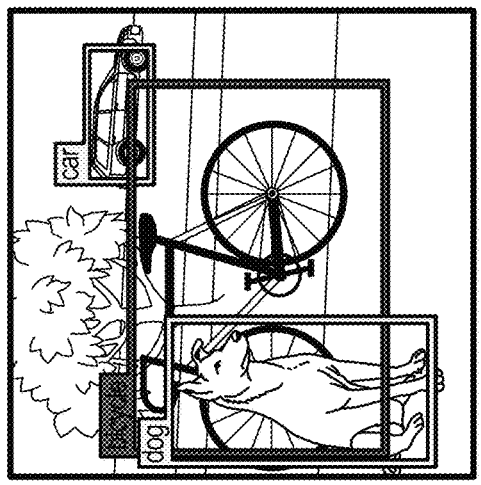
FIGS. 11A, 11B, and 11C are diagrams illustrating an example of a detector.
Figure 11B:
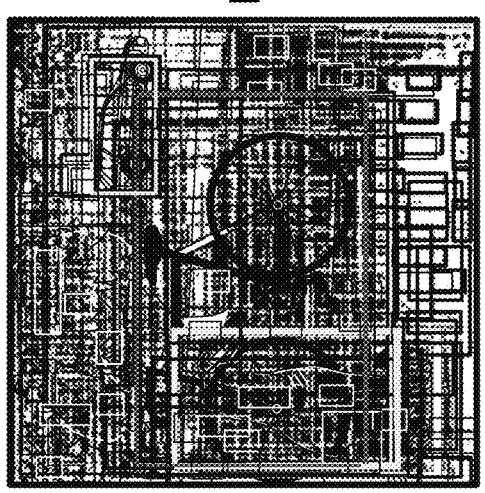
Figure 11A:
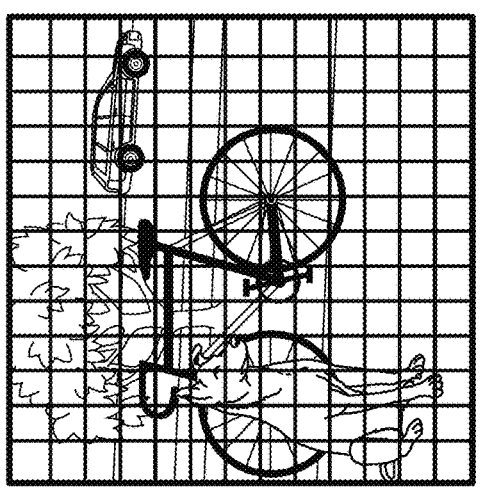

Another deep learning-based detector that can be used by an object detection model to detect or classify objects in images includes the You Only Look Once (YOLO) detector, which is an alternative to the SSD object detection system. FIG. 11A through FIG. 11C are diagrams illustrating an example of a YOLO detector, in accordance with some examples. In particular, FIG. 11A includes an image and FIG. 11B and FIG. 11C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 11A, the YOLO detector divides the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 11B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the gray box with thick borders on the left side of the image in FIG. 11B is 85% sure it contains the object class "dog." There are 169 grid cells (13×13) and each cell predicts 5 bounding boxes, resulting in 1745 bounding boxes in total. Many of the bounding boxes will have very low scores, in which case only the boxes with a final score above a threshold (e.g., above a 30% probability, 40% probability, 50% probability, or other suitable threshold) are kept. FIG. 11C shows an image with the final predicted bounding boxes and classes, including a dog, a bicycle, and a car. As shown, from the 1745 total bounding boxes that were generated, only the three bounding boxes shown in FIG. 11C were kept because they had the best final scores.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), DSPs, central processing units (CPUs), and/or other suitable electronic circuits), and/or can include and/or be implemented using computer software, firmware, or any combination thereof, to perform the various operations described herein.

Figure 12:
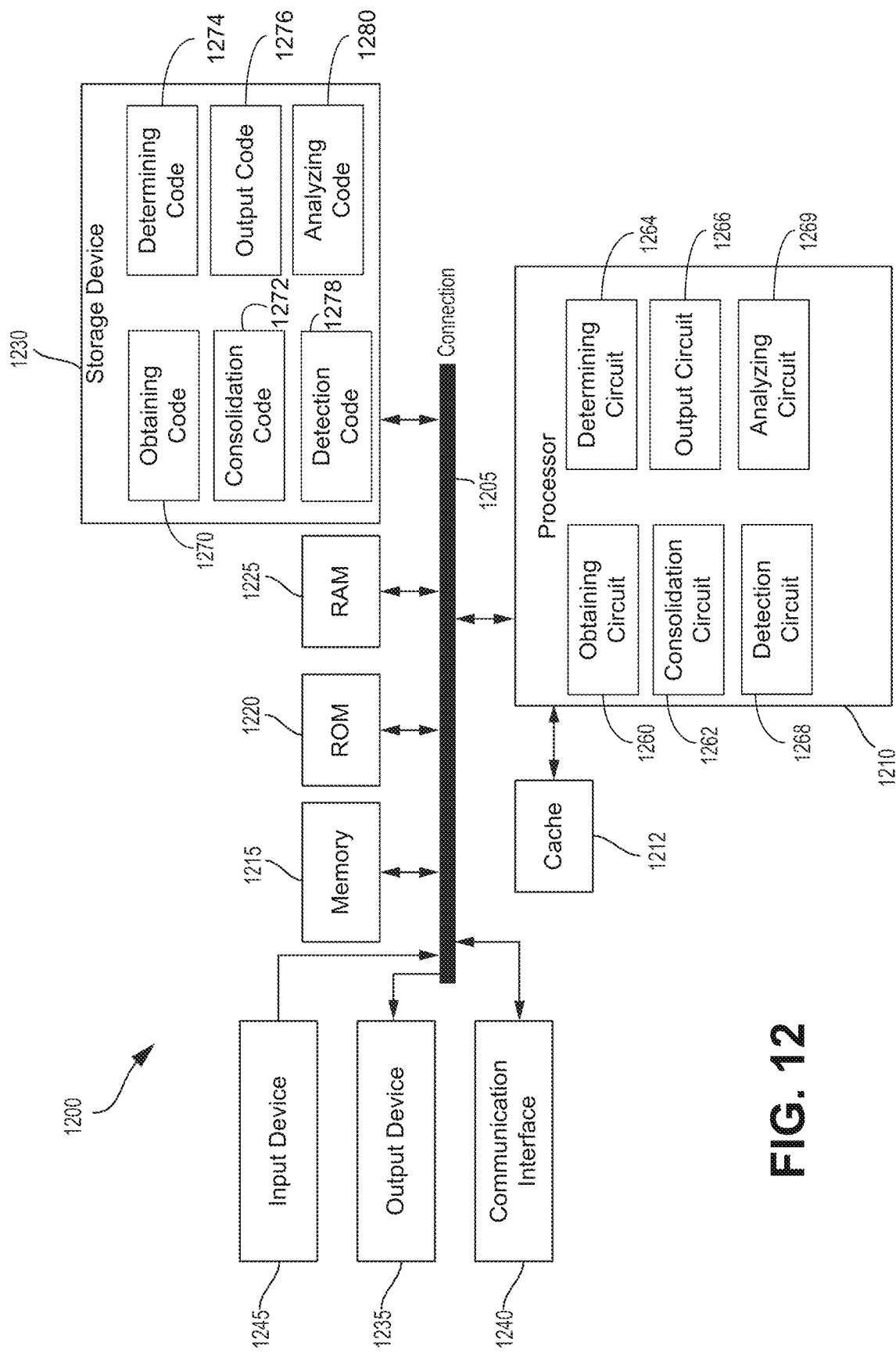
FIG. 12 is a diagram illustrating an example of a system for implementing certain aspects of the present technology.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service. In some aspects, code stored in storage device 1230 may be configured to control processor 1210 to perform operations described herein. In some aspects, the processor 1210 may be a special-purpose processor where instructions or circuitry are incorporated into the actual processor design to perform the operations described herein. Processor 1210 may essentially be a completely self-contained computing system, containing multiple cores or processors, a bus, memory controller, cache, etc. A multi-core processor may be symmetric or asymmetric. The processor 1210 may include circuit 1260 for obtaining (e.g., obtaining sensor data), circuit 1262 for consolidating (e.g., consolidating objects into a single object), circuit 1264 for determining (e.g., determining a velocity or an elevation), circuit 1266 for outputting (e.g., outputting a detection output), circuit 1268 for detecting (e.g., detecting an object), and circuit 1269 for analyzing (e.g., analyzing sensor data).

The storage device 1230 may store code which, when executed by the processors 1210, performs the operations described herein. For example, the storage device 1230 may include code 1270 for obtaining (e.g., obtaining sensor data), code 1272 for consolidating (e.g., consolidating objects into a single object), code 1274 for determining (e.g., determining a velocity or elevation), code 1276 for outputting (e.g., outputting a detection output), code 1278 for detecting (e.g., detecting an object), and code 1280 for analyzing (e.g., analyzing sensor data).

To enable user interaction, computing system 1200 includes an input device 1245, which can represent any number of input mechanisms, such as a microphone for speech, a camera for generating images or video, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus for object detection, comprising: one or more processors being operably configured to: obtain sensor information indicating at least two objects in an environment; determine at least one of a velocity or an elevation associated with each object of the at least two objects; consolidate the at least two objects into a common object based on the at least one of the velocity or the elevation; and output an indication of the common object.

Aspect 2: The apparatus of Aspect 1, wherein the one or more processors are operably configured to determine the at least one of the velocity or the elevation based on the sensor information indicating the at least one of the velocity or the elevation.

Aspect 3: The apparatus of any of Aspects 1 to 2, wherein, to consolidate the at least two objects, the one or more processors are operably configured to determine whether to consolidate the at least two objects based on whether a difference between velocities of the at least two objects is less than a velocity threshold.

Aspect 4: The apparatus of any of Aspects 1 to 3, wherein, to consolidate the at least two objects, the one or more processors are operably configured to determine whether to consolidate the at least two objects based on whether a difference between elevations of the at least two objects is less than an elevation threshold.

Aspect 5: The apparatus of any of Aspects 1 to 4, wherein: the one or more processors are further operably configured to determine whether the velocity is less than a velocity threshold; and the one or more processors are operably configured to consolidate the at least two objects based on the elevation in response to the velocity being less than the velocity threshold.

Aspect 6: The apparatus of any of Aspects 1 to 5, wherein the one or more processors are operably configured to consolidate the at least two objects based on the velocity and the elevation by assigning a higher weight to the elevation as compared to the velocity at lower velocities and a lower weight to the elevation as compared to the velocity at higher velocities.

Aspect 7: The apparatus of any of Aspects 1 to 6, wherein the one or more processors are further operably configured to process, via a machine learning model, the sensor information to generate a machine learning output indicating the at least two objects, and wherein the one or more processors are operably configured to consolidate at least two objects based on the machine learning output.

Aspect 8: The apparatus of any of Aspects 1 to 7, wherein: the sensor information includes a point cloud indicating the at least one of velocity or the elevation and object detection information indicating objects in the environment; the one or more processors are operably configured to map the at least one of the velocity or the elevation indicated by points of the point cloud to the objects indicated by the object detection information; and the one or more processors are configured consolidate the at least two objects based on the mapping of the at least one of the velocity or the elevation to the objects.

Aspect 9: The apparatus of any of Aspects 1 to 8, wherein the one or more processors are further operably configured to determine at least one classification associated with the at least two objects, and wherein the one or more processors are operably configured to consolidate the at least two objects based on the at least one classification.

Aspect 10: The apparatus of Aspect 9, wherein the one or more processors are operably configured to determine the at least one classification based on sensor data.

Aspect 11: The apparatus of Aspect 9, wherein, to determine the at least one classification, the one or more processors are operably configured to receive an indication of the classification.

Aspect 12: The apparatus of any of Aspects 1 to 11, wherein: the one or more processors are further operably configured to analyze input data from a camera via a machine learning model; and the one or more processors are operably configured to consolidate the at least two objects based on an output of an intermediate layer of the machine learning model.

Aspect 13: The apparatus of any of Aspects 1 to 12, wherein the sensor information comprises information from a radio detection and ranging (radar) sensor.

Aspect 14: An apparatus for object detection, comprising: one or more processors operably configured to: obtain sensor information indicating at least two objects in an environment; detect, via a machine learning model, an object in the environment based on the sensor information and at least one of a velocity or an elevation associated with each of the at least two objects, wherein the detected object is associated with the at least two objects indicated by the sensor information; and output an indication of the object.

Aspect 15: The apparatus of Aspect 14, wherein the sensor information indicates the at least one of the velocity or the elevation associated with each of the at least two objects.

Aspect 16: The apparatus of any of Aspects 14 to 15, wherein the sensor information includes: a point cloud indicating the at least one of velocity or the elevation; and object detection information indicating the at least two objects in the environment.

Aspect 17: The apparatus of any of Aspects 14 to 16, wherein: the one or more processors are further operably configured to analyze input data from a camera via another machine learning model; and the one or more processors are operably configured to detect the object based on an output of an intermediate layer of the other machine learning model.

Aspect 18: The apparatus of any of Aspects 14 to 17, wherein the sensor information comprises information from a radio detection and ranging (radar) sensor.

Aspect 19: The apparatus of any of Aspects 14 to 18, wherein the one or more processors are further operably configured to determine at least one classification associated with the object, and wherein the one or more processors are operably configured to detect the object based on the at least one classification.

Aspect 20: The apparatus of Aspect 19, wherein the one or more processors are operably configured to determine the at least one classification based on sensor data.

Aspect 21: The apparatus of Aspect 19, wherein, to determine the at least one classification, the one or more processors are operably configured to receive an indication of the classification.

Aspect 22: A method for object detection, comprising: obtaining sensor information indicating at least two objects in an environment; determining at least one of a velocity or an elevation associated with each object of the at least two objects; consolidating the at least two objects into a common object based on the at least one of the velocity or the elevation; and outputting an indication of the common object.

Aspect 23: The method of Aspect 22, wherein the at least one of the velocity or the elevation is determined based on the sensor information indicating the at least one of the velocity or the elevation.

Aspect 24: The method of any of Aspects 22 to 23, wherein consolidating the at least two objects comprises determining whether to consolidate the at least two objects based on whether a difference between velocities of the at least two objects is less than a velocity threshold.

Aspect 25: The method of any of Aspects 22 to 24, wherein consolidating the at least two objects comprising determining whether to consolidate the at least two objects based on whether a difference between elevations of the at least two objects is less than an elevation threshold.

Aspect 26: The method of any of Aspects 22 to 25, wherein: the method further comprises determining whether the velocity is less than a velocity threshold; and the at least two objects are consolidated based on the elevation in response to the velocity being less than the velocity threshold.

Aspect 27: The method of any of Aspects 22 to 26, wherein the at least two objects are consolidated based on the velocity and the elevation by assigning a higher weight to the elevation as compared to the velocity at lower velocities and a lower weight to the elevation as compared to the velocity at higher velocities.

Aspect 28: The method of any of Aspects 22 to 27, further comprising processing, via a machine learning model, the sensor information to generate a machine learning output indicating the at least two objects, and wherein the at least two objects are consolidated based on the machine learning output.

Aspect 29: The method of any of Aspects 22 to 28, wherein: the sensor information includes a point cloud indicating the at least one of velocity or the elevation and object detection information indicating objects in the environment; the method further comprising mapping the at least one of the velocity or the elevation indicated by points of the point cloud to the objects indicated by the object detection information; and the at least two objects are consolidated based on the mapping of the at least one of the velocity or the elevation to the objects.

Aspect 30: The method of any of Aspects 22 to 29, further comprising determining at least one classification associated with the at least two objects, and wherein the at least two objects are consolidated based on the at least one classification.

Aspect 31: The method of Aspect 30, wherein the at least one classification is determined based on sensor information.

Aspect 32: The method of Aspect 30, wherein determining the at least one classification includes receiving an indication of the classification.

Aspect 33: The method of any of Aspects 22 to 32, wherein: further comprising analyzing input data from a camera via a machine learning model; and the at least two objects are consolidated based on an output of an intermediate layer of the machine learning model.

Aspect 34: The method of any of Aspects 22 to 33, wherein the sensor information comprises information from a radio detection and ranging (radar) sensor.

Aspect 35: A method for object detection, comprising: obtaining sensor information indicating at least two objects in an environment; detecting, via a machine learning model, an object in the environment based on the sensor information and at least one of a velocity or an elevation associated with each of the at least two objects, wherein the detected object is associated with the at least two objects indicated by the sensor information; and outputting an indication of the object.

Aspect 36: The method of Aspect 35, wherein the sensor information indicates the at least one of the velocity or the elevation associated with each of the at least two objects.

Aspect 37: The method of any of Aspects 35 to 36, wherein the sensor information includes: a point cloud indicating the at least one of velocity or the elevation; and object detection information indicating the at least two objects in the environment.

Aspect 38: The method of any of Aspects 35 to 37, wherein: the method further comprises analyzing input data from a camera via another machine learning model; and the object is detected based on an output of an intermediate layer of the other machine learning model.

Aspect 39: The method of any of Aspects 35 to 38, wherein the sensor information comprises information from a radio detection and ranging (radar) sensor.

Aspect 40: The method of any of Aspects 35 to 39, further comprising determining at least one classification associated with the object, and wherein the object is detected based on the at least one classification.

Aspect 41: The method of Aspect 40, wherein the at least one classification is determined based on sensor information.

Aspect 42: The method of Aspect 40, wherein determining the at least one classification includes receiving an indication of the classification.

Aspect 43. A non-transitory computer-readable medium having stored thereon instructions that, when executed by one or more processors, cause the one or more processors to perform operations according to any of Aspects 22 to 34.

Aspect 44. An apparatus for object detection, the apparatus comprising one or more means for performing operations according to any of Aspects 22 to 34.

Aspect 43. A non-transitory computer-readable medium having stored thereon instructions that, when executed by one or more processors, cause the one or more processors to perform operations according to any of Aspects 35 to 42.

Aspect 44. An apparatus for object detection, the apparatus comprising one or more means for performing operations according to any of Aspects 35 to 42.

Aspect 43. A non-transitory computer-readable medium having stored thereon instructions that, when executed by one or more processors, cause the one or more processors to perform operations according to any of Aspects 22 to 34 and Aspects 35 to 42.

Aspect 44. An apparatus for object detection, the apparatus comprising one or more means for performing operations according to any of Aspects 22 to 34 and Aspects 35 to 42.

What is claimed is:

1. An apparatus for object detection, comprising:
one or more processors operably configured to:
obtain sensor information indicating at least two objects in an environment;
determine at least one of a velocity or an elevation associated with each object of the at least two objects;
consolidate the at least two objects into a common object using the velocity and the elevation based on an assignment of higher weights to elevations as compared to velocities that are less than a velocity threshold and an assignment of lower weights to elevations as compared to velocities that are greater than the velocity threshold; and
output an indication of the common object.

2. The apparatus of claim 1, wherein the one or more processors are operably configured to determine the at least one of the velocity or the elevation based on the sensor information indicating the at least one of the velocity or the elevation.

3. The apparatus of claim 1, wherein the one or more processors are operably configured to determine whether to consolidate the at least two objects based on whether a difference between velocities of the at least two objects is less than a velocity threshold.

4. The apparatus of claim 1, wherein the one or more processors are operably configured to determine whether to consolidate the at least two objects based on whether a difference between elevations of the at least two objects is less than an elevation threshold.

5. The apparatus of claim 1, wherein the one or more processors are further operably configured to:
determine whether the velocity is less than the velocity threshold; and
consolidate the at least two objects based on the elevation in response to the velocity being less than the velocity threshold.

6. The apparatus of claim 1, wherein the one or more processors are further operably configured to process, via a machine learning model, the sensor information to generate a machine learning output indicating the at least two objects, and wherein the one or more processors are operably configured to consolidate at least two objects based on the machine learning output.

7. The apparatus of claim 1, wherein:
the sensor information includes a point cloud indicating the at least one of velocity or the elevation and object detection information indicating objects in the environment;
the one or more processors are operably configured to map the at least one of the velocity or the elevation indicated by points of the point cloud to the objects indicated by the object detection information; and
the one or more processors are operably configured to consolidate the at least two objects based on the mapping of the at least one of the velocity or the elevation to the objects.

8. The apparatus of claim 1, wherein the one or more processors are further operably configured to:
determine at least one classification associated with the at least two objects; and
consolidate the at least two objects based on the at least one classification.

9. The apparatus of claim 8, wherein the one or more processors are operably configured to determine the at least one classification based on sensor data.

10. The apparatus of claim 8, wherein, to determine the at least one classification, the one or more processors are operably configured to receive an indication of the classification.

11. The apparatus of claim 1, wherein the one or more processors are further operably configured to:
analyze input data from a camera via a machine learning model; and
consolidate the at least two objects based on an output of an intermediate layer of the machine learning model.

12. The apparatus of claim 1, wherein the sensor information comprises information from a radio detection and ranging (radar) sensor.

13. A method for object detection, comprising:
obtaining sensor information indicating at least two objects in an environment;
determining at least one of a velocity or an elevation associated with each object of the at least two objects;
consolidating the at least two objects into a common object using the velocity and the elevation based on an assignment of higher weights to elevations as compared to velocities that are less than a velocity threshold and an assignment of lower weights to elevations as compared to velocities that are greater than the velocity threshold; and
outputting an indication of the common object.

14. The method of claim 13, wherein the at least one of the velocity or the elevation is determined based on the sensor information indicating the at least one of the velocity or the elevation.

15. The method of claim 13, further comprising determining whether to consolidate the at least two objects based on whether a difference between velocities of the at least two objects is less than a velocity threshold.

16. The method of claim 13, further comprising determining whether to consolidate the at least two objects based on whether a difference between elevations of the at least two objects is less than an elevation threshold.

17. The method of claim 13, further comprising determining whether the velocity is less than a velocity threshold; and, wherein the at least two objects are consolidated based on the elevation in response to the velocity being less than the velocity threshold.

18. The method of claim 13, further comprising processing, via a machine learning model, the sensor information to generate a machine learning output indicating the at least two objects, and wherein the at least two objects are consolidated based on the machine learning output.

19. The method of claim 13, wherein:
the sensor information includes a point cloud indicating the at least one of velocity or the elevation and object detection information indicating objects in the environment;
the method further comprising mapping the at least one of the velocity or the elevation indicated by points of the point cloud to the objects indicated by the object detection information; and
the at least two objects are consolidated based on the mapping of the at least one of the velocity or the elevation to the objects.

20. The method of claim 13, further comprising determining at least one classification associated with the at least two objects, and wherein the at least two objects are consolidated based on the at least one classification.

21. The method of claim 20, wherein the at least one classification is determined based on sensor information.

22. The method of claim 20, wherein determining the at least one classification includes receiving an indication of the classification.

23. The method of claim 13, further comprising analyzing input data from a camera via a machine learning model, wherein the at least two objects are consolidated based on an output of an intermediate layer of the machine learning model.

24. The method of claim 13, wherein the sensor information comprises information from a radio detection and ranging (radar) sensor.

25. A non-transitory computer-readable medium having instructions stored thereon, which when executed by one or more processors, cause the one or more processors to:
obtain sensor information indicating at least two objects in an environment;
determine at least one of a velocity or an elevation associated with each object of the at least two objects;
consolidate the at least two objects into a common object using the velocity and the elevation based on an assignment of higher weights to elevations as compared to velocities that are less than a velocity threshold and an assignment of lower weights to elevations as compared to velocities that are greater than the velocity threshold; and output an indication of the common object.

26. An apparatus for object detection, comprising:
means for obtaining sensor information indicating at least two objects in an environment;
means for determining at least one of a velocity or an elevation associated with each object of the at least two objects;
means for consolidating the at least two objects into a common object using the velocity and the elevation based on an assignment of higher weights to elevations as compared to velocities that are less than a velocity threshold and an assignment of lower weights to elevations as compared to velocities that are greater than the velocity threshold; and
means for outputting an indication of the common object.

27. The non-transitory computer-readable medium of claim 25, wherein the instructions, when executed by the one or more processors, cause the one or more processors to determine whether to consolidate the at least two objects based on whether a difference between velocities of the at least two objects is less than a velocity threshold.

28. The non-transitory computer-readable medium of claim 25, wherein the instructions, when executed by the one or more processors, cause the one or more processors to determine whether to consolidate the at least two objects based on whether a difference between elevations of the at least two objects is less than an elevation threshold.

* * * * *